(12) United States Patent
Hecht

(10) Patent No.: US 8,104,999 B2
(45) Date of Patent: Jan. 31, 2012

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 442 days.

(21) Appl. No.: 12/416,474

(22) Filed: Apr. 1, 2009

(65) Prior Publication Data

US 2009/0285645 A1 Nov. 19, 2009

(30) Foreign Application Priority Data

May 18, 2008 (IL) .......................... 191520

(51) Int. Cl.
*B23B 27/04* (2006.01)
*B23B 29/14* (2006.01)

(52) U.S. Cl. ....................... 407/110; 407/113

(58) Field of Classification Search .................. 407/102, 407/110, 108, 113, 117
See application file for complete search history.

(56) References Cited

U.S. PATENT DOCUMENTS

| | | | |
|---|---|---|---|
| 4,801,224 A | 1/1989 | Pettersson et al. | |
| 6,086,291 A | 7/2000 | Hansson et al. | |
| 6,139,227 A * | 10/2000 | Schafer et al. | 407/110 |
| 6,244,790 B1 * | 6/2001 | Kingdom et al. | 407/110 |
| 6,428,247 B1 * | 8/2002 | Friedman | 407/110 |
| 2008/0286057 A1 * | 11/2008 | Nagaya et al. | 407/110 |

FOREIGN PATENT DOCUMENTS

DE 10 2005 019 945 11/2006

OTHER PUBLICATIONS

International Search Report in PCT/IL2009/000393, dated Aug. 14, 2009.

* cited by examiner

*Primary Examiner* — Will Fridie, Jr.
(74) *Attorney, Agent, or Firm* — Womble Carlyle

(57) ABSTRACT

A cutting tool for grooving and turning operations has a removably securable cutting insert. The cutting insert is clamped in an insert holder with a longitudinally extending insert receiving slot lower surface. The insert receiving slot lower surface has two spaced apart contact sections, including a first contact section at a rear end having a V-shaped slot clamping surface with a wedge angle $\alpha 1$ in clamping contact with a first V-shaped insert clamping surface of the cutting insert lower surface also with a wedge angle $\alpha 1$, and a second contact section at a front end having a V-shaped slot clamping surface with a wedge angle $\alpha 2$ making clamping contact with a second V-shaped insert clamping surface of the cutting insert lower surface also with a wedge angle $\alpha 2$, where $\alpha 1$ and $\alpha 2$ are different.

21 Claims, 10 Drawing Sheets

CUTTING TOOL AND CUTTING INSERT THEREFOR

FIELD OF THE INVENTION

The present invention relates to a cutting tool and a cutting insert for use in metal cutting processes in general, and for grooving and turning operations in particular.

BACKGROUND OF THE INVENTION

Cutting tools, cutting inserts, and insert holders in which they are retained for parting and grooving operations as disclosed in U.S. Pat. No. 4,801,224, are typically small in width and subjected to single direction cutting forces. These cutting forces, produced as a result of axial direction machine feed, are transmitted through the insert tip and the forward section of the insert holder lower surface.

Support of the insert is provided by a lower V-shaped insert holder male surface (when viewed in cross-section) extending parallel to the axial machine feed direction with an obtuse internal angle between the two surface components, corresponding with an equivalent V-shaped surface on the insert with an obtuse external angle between the two surface components, where large forces can be absorbed whilst minimizing the risk of fracturing the insert. The upper surfaces of both the insert and insert holder also share these same features.

U.S. Pat. No. 6,086,291 discloses a cutting tool for parting, grooving, and turning operations where each clamping surface includes a second V-shaped feature. A ridge style feature of narrower wedge angle is introduced along the length of the male V-shaped surface of the insert holder, and a flute style feature of narrower wedge angle is introduced along the length of the female V-shaped surface of the insert.

The insert and insert holder are manufactured such that when assembled, a small gap exists between the ridge and flute side surfaces. Thus, during operation, the wider obtuse angled V-shaped surfaces generally support the central main forces, and the narrower angled ridge and flute V-shaped surfaces generally support the transverse forces. The presence of a small gap between the ridge and flute side surfaces may give rise to an initial transverse movement of the insert of magnitude equal to the gap size at commencement of a turning operation.

U.S. Pat. No. 6,244,790 discloses a cutting tool for parting, grooving, and turning operations, introducing lower support surfaces with a series of intermeshing ridges and grooves of V-shaped profile, each with a common narrow wedge angle. This solution is aimed at providing increased stability of the insert within the insert holder against twisting, whilst, in theory, also reducing the risk of the insert lower surface splitting by providing a larger surface area for the clamping force to be distributed.

Distribution of the clamping force over a large surface area requires successful mating of, and simultaneous contact between, the several ridge surfaces extending the entire longitudinal direction of the cutting insert, and the equal number of grooves extending along the entire longitudinal direction of the cutting insert pocket.

SUMMARY OF THE INVENTION

In one aspect, the present invention is directed to a cutting insert comprising:
upper and lower surfaces;
a peripheral side surface extending between the upper and lower surfaces, the peripheral side surface comprising front and rear end surfaces with a longitudinal axis passing therebetween;
peripheral edges formed at the intersection of the upper and lower surfaces with the peripheral side surface, wherein at least one portion of at least one of the peripheral edges comprises a cutting edge; and
upper and lower clamping portions formed on the upper and lower surfaces respectively; wherein:
at least a first of the upper and lower clamping portions has first and second insert clamping surfaces, each insert clamping surface having a generally V-shaped cross-section;
surface components of the first insert clamping surface form a first wedge angle ($\alpha 1$);
surface components of the second insert clamping surface form a second wedge angle ($\alpha 2$);
wedge angles ($\alpha 1$) and ($\alpha 2$) are different from one another; and
the first and second insert clamping surfaces have different longitudinal lengths.

In specific embodiments of the cutting insert, one or more of the following features may be found: the second insert clamping surface may fully extend from the front end surface to the rear end surface; the second insert clamping surface may be a groove type V-shaped clamping surface; the second wedge angle ($\alpha 2$) may be obtuse; the first wedge angle ($\alpha 1$) may be less than the second wedge angle ($\alpha 2$); the cutting insert may have mirror symmetry about a major plane passing through the upper and lower surfaces and containing the longitudinal axis; the cutting insert may have mirror symmetry about a minor plane perpendicular to the longitudinal axis; two portions of at least one of the peripheral edges comprise a cutting edge; and a second of the upper and lower clamping portions has a third insert clamping surface having surface components which form a third wedge angle ($\alpha 3$) which is less than second wedge angle ($\alpha 2$).

In another aspect, the invention is directed to an insert holder comprising:
a holder head with an insert receiving slot opening out to a forward end of the insert holder, wherein the insert receiving slot includes upper and lower receiving slot surfaces sharing a common longitudinal direction; and
upper and lower clamping portions formed on the upper and lower receiving slot surfaces respectively, wherein the lower clamping portion has generally V-shaped first and second slot clamping surfaces positioned at respective first and second contact sections along the lower receiving slot surface;
wherein:
the first contact section is located adjacent a rear end of the lower receiving slot surface;
the second contact section is located adjacent a front end of the lower receiving slot surface;
surface components of the first slot clamping surface form a first wedge angle ($\alpha 1$);
surface components of the second slot clamping surface form an obtuse second wedge angle ($\alpha 2$); and
the first wedge angle ($\alpha 1$) is smaller than the second wedge angle ($\alpha 2$).

In specific embodiments of the insert holder, one or more of the following features may be found: the first wedge angle ($\alpha 1$) may be acute; the upper clamping portion may have a generally V-shaped slot clamping surface with surface components forming a third wedge angle ($\alpha 3$); the third wedge angle ($\alpha 3$) may be less than the second wedge angle ($\alpha 2$); and the third wedge angle ($\alpha 3$) may be equal to the first wedge angle ($\alpha 1$).

In still another aspect, the invention is directed to cutting tool comprising an insert holder and a cutting insert removably securable in the insert holder.

In the inventive cutting tool, the cutting insert comprises:
upper and lower surfaces;
a peripheral side surface extending between the upper and lower surfaces, the peripheral side surface comprising front and rear end surfaces with a longitudinal axis passing therebetween;
peripheral edges formed at the intersection of the upper and lower surfaces with the peripheral side surface, wherein at least one portion of at least one of the peripheral edges comprises a cutting edge; wherein:
the lower surface has first and second insert clamping surfaces, each insert clamping surface having a generally V-shaped cross-section;
surface components of the first insert clamping surface form a first wedge angle (α1); surface components of the second insert clamping surface form an obtuse second wedge angle (α2); and
the first wedge angle (α1) is smaller than the second wedge angle (α2).

Also, in the inventive cutting tool, the insert holder comprises:
a holder head with an insert receiving slot opening out to a forward end of the insert holder, wherein the insert receiving slot includes upper and lower receiving slot surfaces sharing a common longitudinal direction;
upper and lower clamping portions formed on the upper and lower receiving slot surfaces respectively, wherein the lower clamping portion has generally V-shaped first and second slot clamping surfaces positioned at respective first and second contact sections along the lower receiving slot surface; wherein:
the first contact section is located adjacent a rear end of the lower receiving slot surface;
the second contact section is located adjacent a front end of the lower receiving slot surface;
surface components of the generally V-shaped slot clamping surface at the first contact section form a first wedge angle (α1);
surface components of the generally V-shaped slot clamping surface at the second contact section form an obtuse second wedge angle (α2); and
the first wedge angle (α1) is smaller than the second wedge angle (α2).

Furthermore, in the inventive cutting tool, the clamping contact between the first insert clamping surface and the first slot clamping surface occurs only at the first contact section; clamping contact between the second insert clamping surface and the second slot clamping surface occurs only at the second contact section; and the holder head is formed of a first material and the cutting insert is formed of a second material which is harder than the first material.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
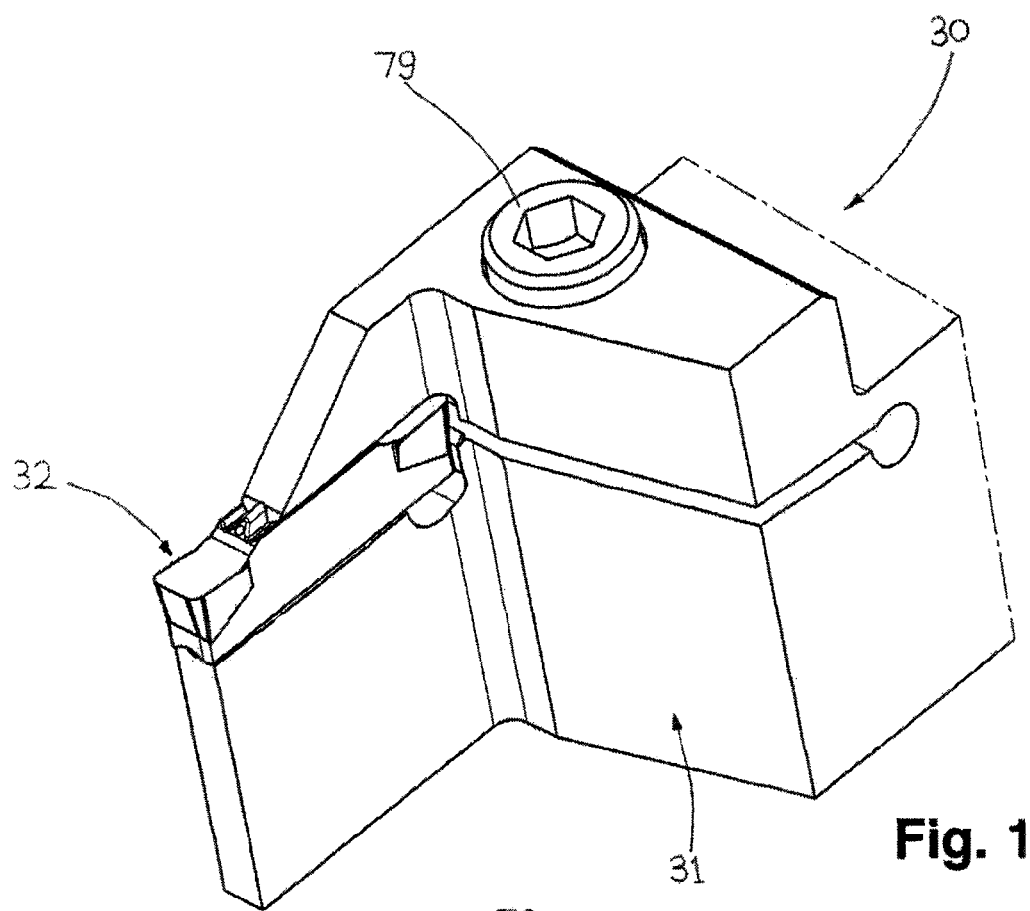
FIG. 1 is of a perspective view of a cutting tool in accordance with a first embodiment of the present invention.
Figure 2:
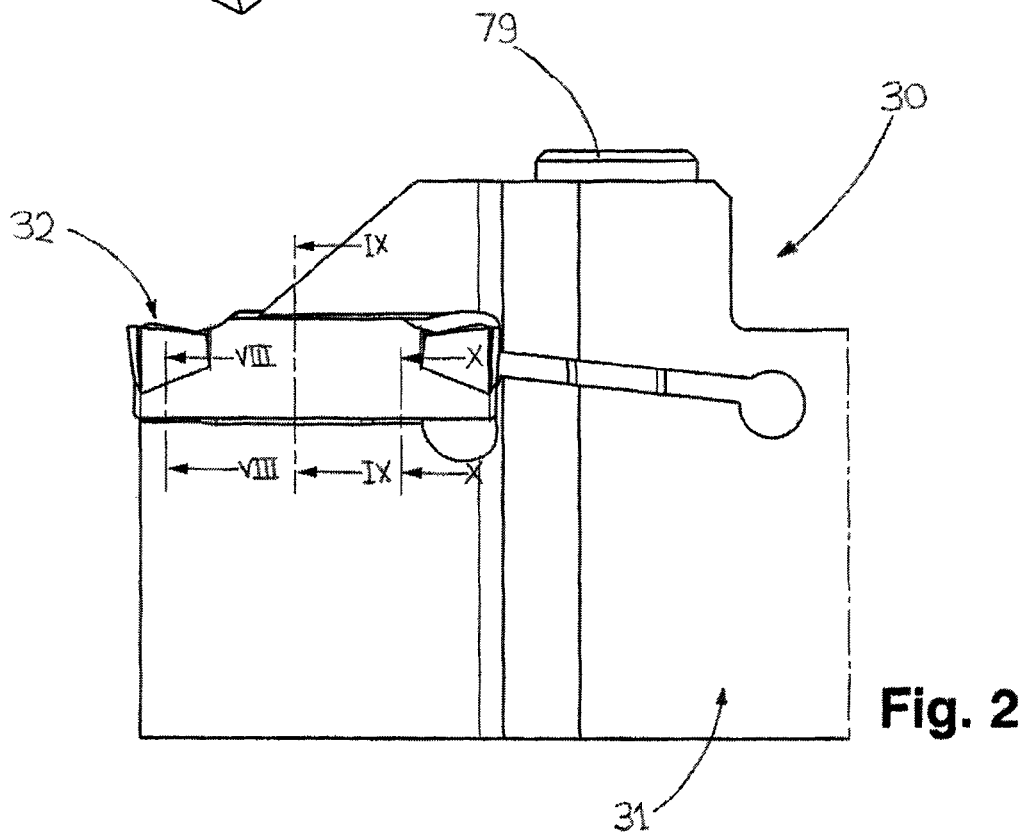
FIG. 2 is a side view of the cutting tool shown in FIG. 1.

Attention is first drawn to FIGS. 1 and 2, showing a cutting tool 30 comprised of an insert holder 31 and a cutting insert 32. The insert holder 31 is generally manufactured from steel, and the cutting insert 32 is generally manufactured by form pressing and sintering a cemented carbide, such as tungsten carbide, and can be coated or uncoated.

Figure 3:
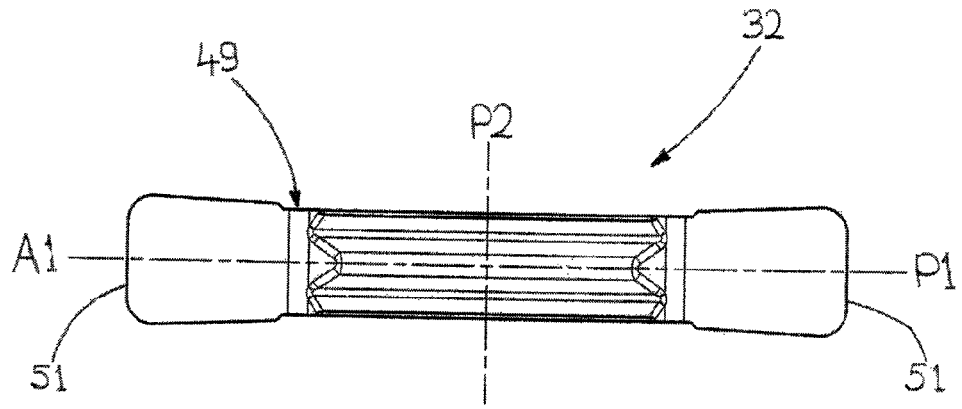
FIG. 3 is a top view of the cutting insert shown in FIG. 1.
Figure 4:
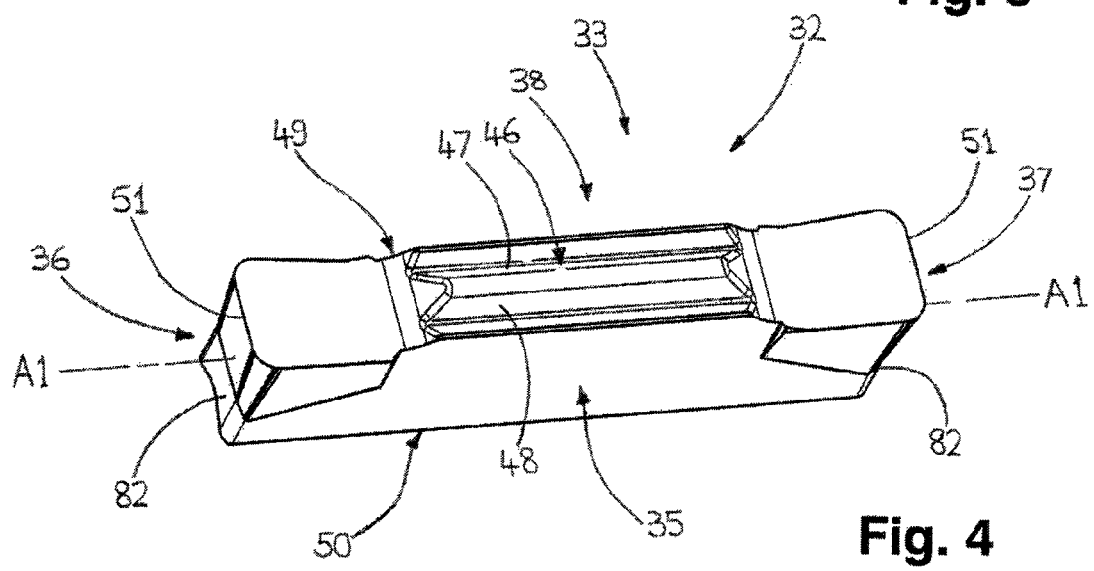
FIG. 4 is a perspective top view of the cutting insert shown in FIG. 1.
Figure 5:
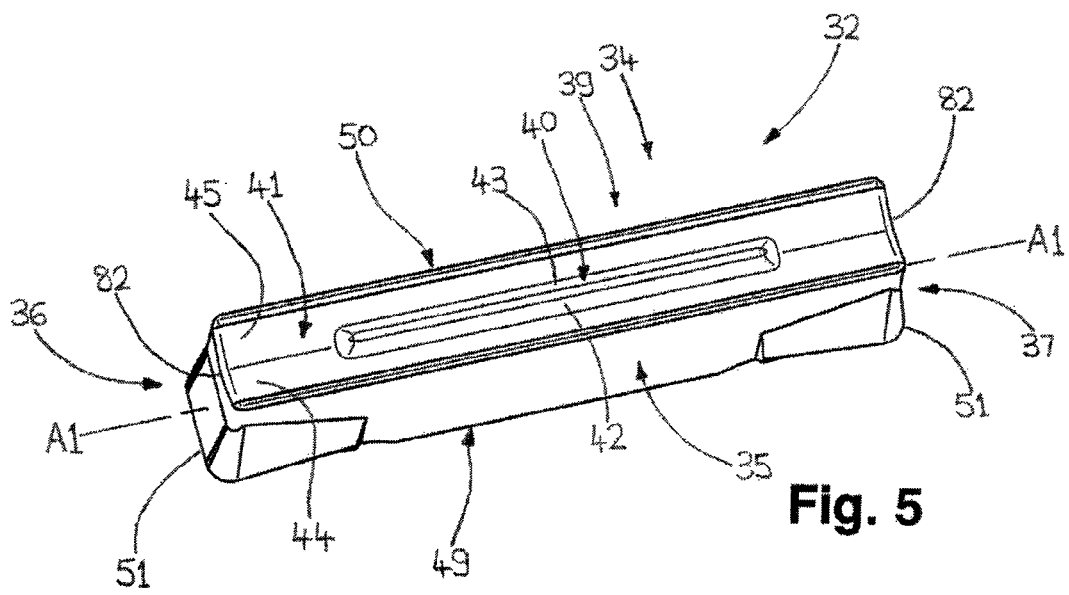
FIG. 5 is a perspective bottom view of the cutting insert shown in FIG. 1.

The cutting insert 32, as shown in FIGS. 3 to 5, comprises upper and lower surfaces 33, 34 and a peripheral side surface 35 extending between the upper and lower surfaces 33, 34. The peripheral side surface 35 comprises front and rear end surfaces 36, 37 with a longitudinal axis A1 passing therebetween. Upper and lower clamping portions 38, 39 are formed on the upper and lower surfaces 33, 34 respectively.

Figure 8:
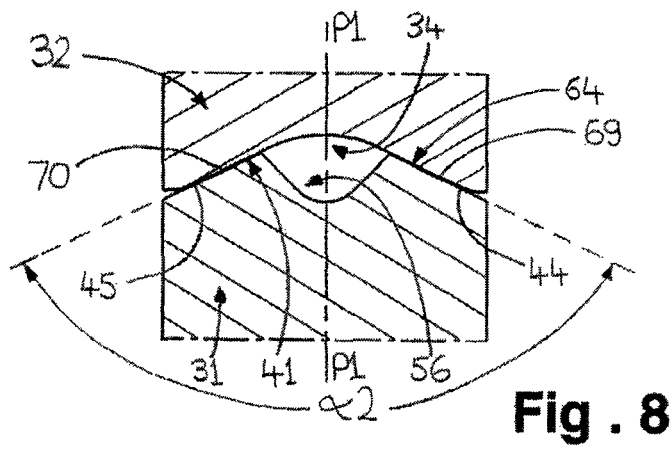
FIG. 8 is a cross-sectional view of the cutting tool shown in FIG. 2 taken along the line VIII-VIII.
Figure 9:
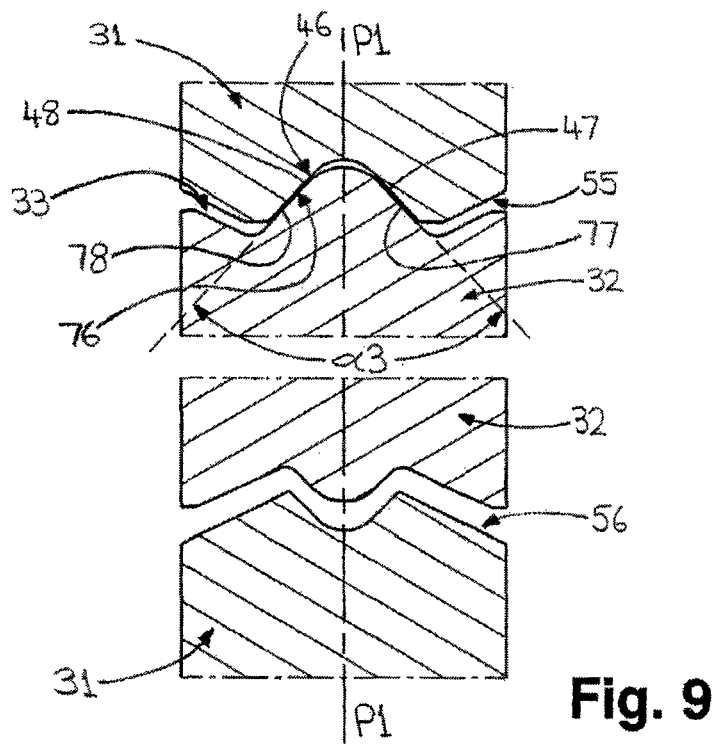
FIG. 9 is a cross-sectional view of the cutting tool shown in FIG. 2 taken along the line IX-IX.
Figure 10:
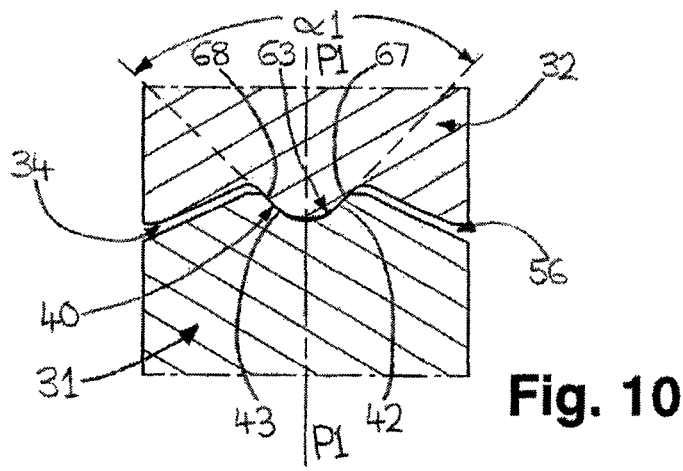
FIG. 10 is a cross-sectional view of the cutting tool shown in FIG. 2 taken along the line X-X.

According to a first embodiment of the present invention, the lower clamping portion 39 is comprised of two V-shaped insert clamping surfaces 40, 41. The first is a ridge type V-shaped insert clamping surface 40, as shown in FIG. 10, with two surface components 42, 43 forming an internal wedge angle α1, and the second is a groove type V-shaped insert clamping surface 41, as shown in FIG. 8, with two surface components 44, 45 forming an obtuse external wedge angle α2, where α1 is less than α2. The groove type V-shaped insert clamping surface 41 fully extends from the front end surface 36 to the rear end surface 37, whereas the ridge type V-shaped insert clamping surface 40 may extend longitudinally from a point rearward of the front end surface 36 to a point forward of the rear end surface 37. That is, the groove type V-shaped clamping surface 41 and the ridge type V-shaped insert clamping surface 40 may have different longitudinal lengths (i.e., lengths taken along the longitudinal axis A1), with the latter being shorter than the former. On the other hand, the groove type V-shaped insert clamping surface 41 and the ridge type V-shaped insert clamping surface 40 may have the same longitudinal lengths. The upper clamping portion 38 is comprised of a single ridge type V-shaped insert clamping surface 46, as shown in FIG. 9, with two surface components 47, 48 forming an internal wedge angle α3, where α3 is less than α2.

Upper and lower peripheral edges 49, 50 are formed at the intersection of the upper and lower surfaces 33, 34 with the peripheral side surface 35, where two cutting edges 51 are formed on the upper peripheral edge 49.

Also according to the first embodiment, the cutting insert 32 may have mirror symmetry about a major plane P1, passing through the upper and lower surfaces 33, 34 and the longitudinal axis A1, and in addition mirror symmetry about a minor plane P2, which is perpendicular to P1.

It should be appreciated that throughout the detailed description and claims, the surface components of the V-shaped clamping surfaces are substantially planar, and use of the term; V-shaped clamping surface, is not restricted to a clamping surface with two surface planar components forming a 'V' shape and intersecting at a vertex point (when viewed in cross-section), but also accounts for a clamping surface with a curve or radius joining the two planar surface components, or a clamping surface with a secondary groove or ridge feature between the two planar surface components.

It should also be appreciated that throughout the detailed description and claims, an "internal angle" refers to an angle between two surface components of a member surface as measured internal to the member, whereas an "external angle" refers to an angle between two surface components of a member surface as measured external to the member.

Figure 6:
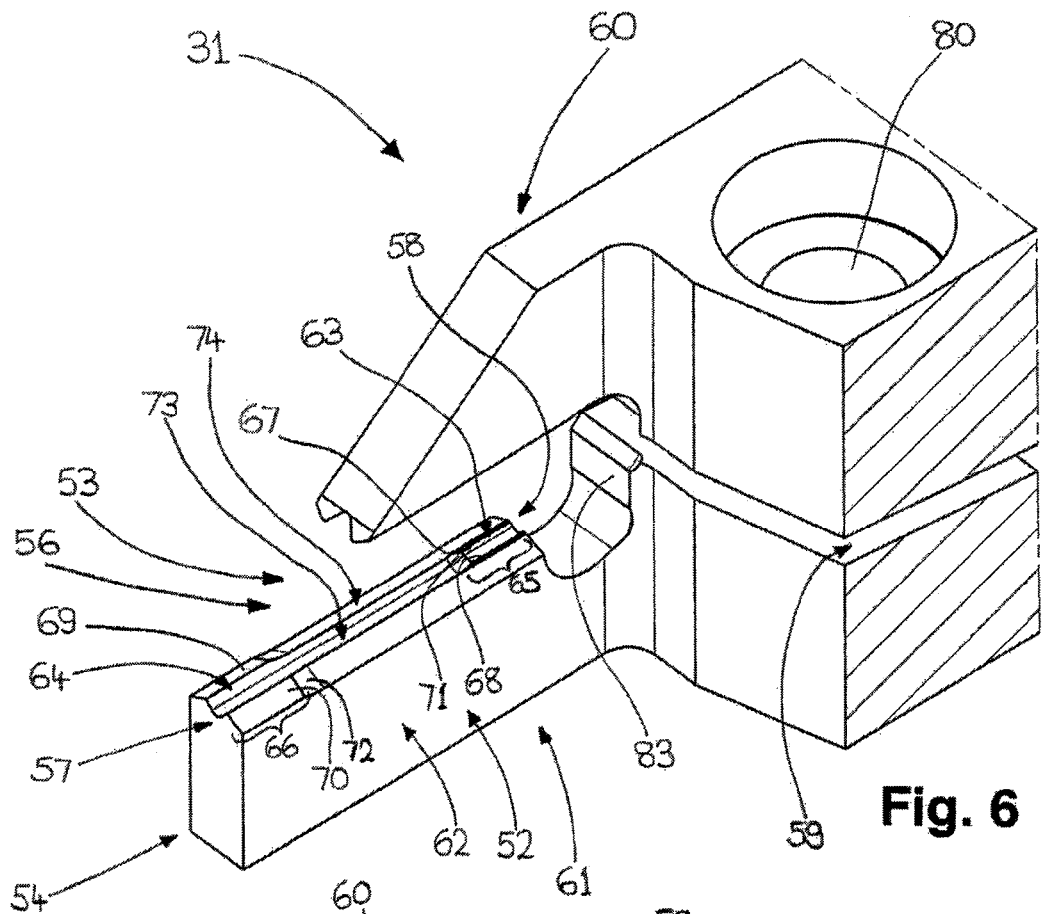
FIG. 6 is a perspective top view of the insert holder shown in FIG. 1.
Figure 7:
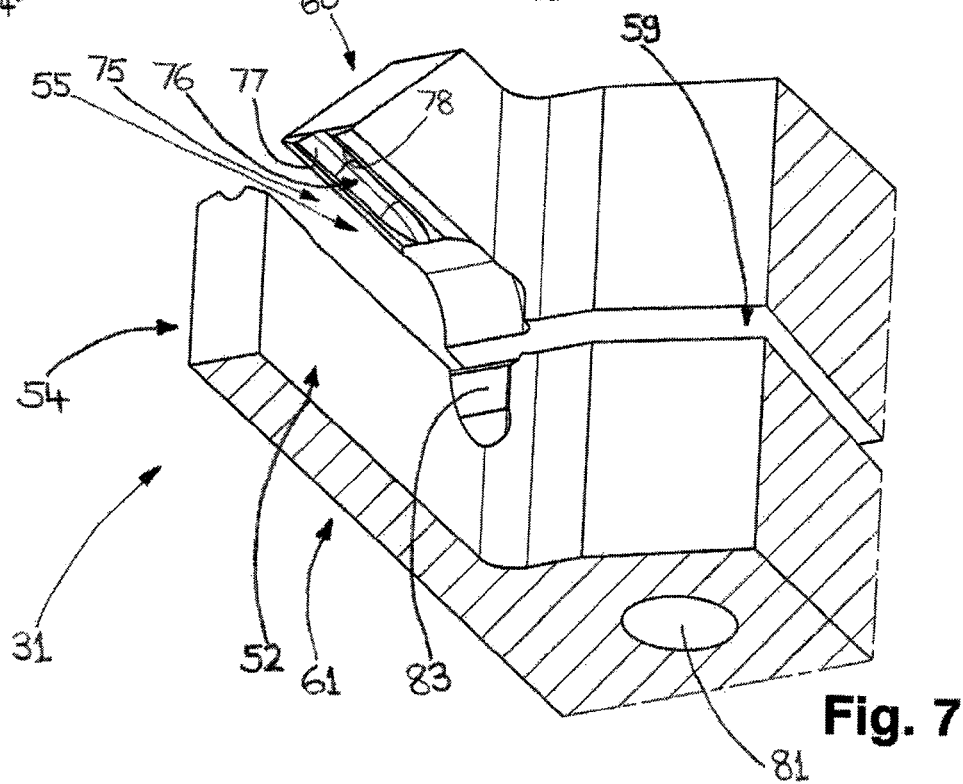
FIG. 7 is a perspective bottom view of the insert holder shown in FIG. 1.

As shown in FIGS. 6 and 7, the insert holder 31 comprises a holder head 52 having an insert receiving slot 53 opening out to a forward end 54 of the insert holder 31, with upper and lower receiving slot surfaces 55, 56 sharing a common longitudinal direction from a front end 57 to a rear end 58 of the lower receiving slot surface 56. Extending rearwards from the insert receiving slot 53 is a narrow spring slot 59 which divides the holder head 52 into an upper clamping jaw 60 and a lower base jaw 61.

According to the first embodiment of the present invention, a lower clamping portion 62 formed on the lower receiving slot surface 56 is comprised of two V-shaped slot clamping surfaces 63, 64, the first a groove type V-shaped slot clamping surface 63 and the second a ridge type V-shaped slot clamping surface 64. The two V-shaped slot clamping surfaces 63, 64 are positioned at separate contact sections 65, 66 along the longitudinal direction of the lower receiving slot surface 56. A first contact section 65 is positioned adjacent the rear end 58, where two surface components 67, 68 of the groove type V-shaped slot clamping surface 63, as shown in FIG. 10, form an external wedge angle α1, and a second contact section 66 is positioned adjacent the front end 57, where two surface components 69, 70 of the ridge type V-shaped slot clamping surface 64, as shown in FIG. 8, form an obtuse internal wedge angle α2, where α1 is less than α2.

As shown in FIG. 6, a rear step 71 transverse to the longitudinal direction of the lower receiving slot surface 56 defines the physical boundary of the first contact section 65, and a front step 72 transverse to the longitudinal direction of the lower receiving slot surface 56 defines the physical boundary of the second contact section 66.

A groove type guiding surface 73 forward of the rear step 71 and a ridge type guiding surface 74 rearward of the front step 72 on the lower receiving slot surface 56, are not features of the lower clamping portion 62 of the insert holder 31, and do not provide a means of clamping contact with the lower clamping portion 39 of the cutting insert 32.

An upper clamping portion 75 formed on the upper receiving slot surface 55 is comprised of a single groove type V-shaped slot clamping surface 76, with two surface components 77, 78, as shown in FIG. 9, forming an external wedge angle α3, where α3 is less than α2.

Also according to the first embodiment, a fastening screw 79 positioned within the through bore 80 of the upper clamping jaw 60 and rotatable in a threaded bore 81 of the lower base jaw 61, maybe used to control the distance between the upper and lower receiving slot surfaces 55, 56, in order to clamp or release the cutting insert 32.

Assembly of the cutting insert 32 within the insert holder 31 of the first embodiment can be described in the following four stages:—

The first stage requires confirmation that the distance between the upper and lower receiving slot surfaces 55, 56 is sufficient to accept the cutting insert 32. This may require an operator to rotate the fastening screw 79 in an anti-clockwise direction to allow the spring effect of the spring slot 59 to release the upper clamping jaw 60.

The second stage of assembly requires the operator to interface the groove type V-shaped insert clamping surface 41 of the cutting insert 32 lower surface 34 with the ridge type V-shaped slot clamping surface 64 of the insert holder 31 lower receiving slot surface 56.

The third assembly stage requires the operator to slide the cutting insert 32 along the longitudinal direction of the lower receiving slot surface 56, until an end abutment surface 82 of the cutting insert 32, generally parallel to minor plane P2, abuts against a vertical abutment wall 83 of the insert holder 31.

The fourth assembly stage requires the operator to rotate the fastening screw 79 in a clockwise direction to overcome the spring effect of the spring slot 59, and close the distance between the upper and lower receiving slot surfaces 55, 56 until the cutting insert 32 is firmly secured in the insert holder 31.

With the cutting insert 32 firmly secured in the insert holder 31, clamping contact occurs between the cutting insert 32 and insert holder 31 as described below.

The groove type V-shaped insert clamping surface 41 of the cutting insert 32 lower surface 34 is in clamping contact with the ridge type V-shaped slot clamping surface 64 at the second contact section 66 of the insert holder 31 lower receiving slot surface 56, where as shown in FIG. 8, the surface components 44, 45 of the groove type V-shaped insert clamping surface 41 of the cutting insert 32 lower surface 34 are in respective abutment with the surface components 69, 70 of the ridge type V-shaped slot clamping surface 64 of the insert holder 31 lower receiving slot surface 56, and the surface components 44, 45 and 69, 70 share a common obtuse wedge angle α2. Wedge angle α2 has a typical range of 120°-150°.

The ridge type V-shaped insert clamping surface 40 of the cutting insert 32 lower surface 34 is in clamping contact with the groove type V-shaped slot clamping surface 63 at the first contact section 65 of the insert holder 31 lower receiving slot surface 56, where as shown in FIG. 10, the surface components 42, 43 of the ridge type V-shaped insert clamping surface 40 of the cutting insert 32 lower surface 34 are in respective abutment with the surface components 67, 68 of the groove type V-shaped slot clamping surface 63 of the insert holder 31 lower receiving slot surface 56, and the surface components 42, 43 and 67, 68 share a common wedge angle α1, where α1 is less than α2. Wedge angle α1 has a typical range of 60°-120°.

Clamping contact between the V-shaped clamping surface components 44, 45 and 69, 70 at the second contact section 66 of the insert holder 31 lower receiving slot surface 56 occurs at a greater distance from major plane P1 of the cutting insert 32 than clamping contact between the V-shaped clamping surface components 42, 43 and 67, 68 at the first contact section 65 of the insert holder 31 lower receiving slot surface 56.

No clamping contact is made between the cutting insert 32 and insert holder 31, as shown in FIG. 9, along the longitudinal direction of the insert holder 31 lower receiving slot surface 56, between the rear step 71 of the first contact section 65 and the front step 72 of the second contact section 66.

The ridge type V-shaped insert clamping surface 46 of the cutting insert 32 upper surface 33 is in clamping contact with the groove type V-shaped slot clamping surface 76 of the insert holder 31 upper receiving slot surface 55, where as shown in FIG. 9, the surface components 47, 48 of the ridge type V-shaped insert clamping surface 46 of the cutting insert 32 upper surface 33 are in respective abutment with the surface components 77, 78 of the groove type V-shaped slot clamping surface 76 of the insert holder 31 upper receiving slot surface 55, and the surface components 47, 48 and 77, 78 share a common wedge angle α3, where α3 is less than α2. Wedge angle α3 has a typical range of 60°-120°.

Figure 11:
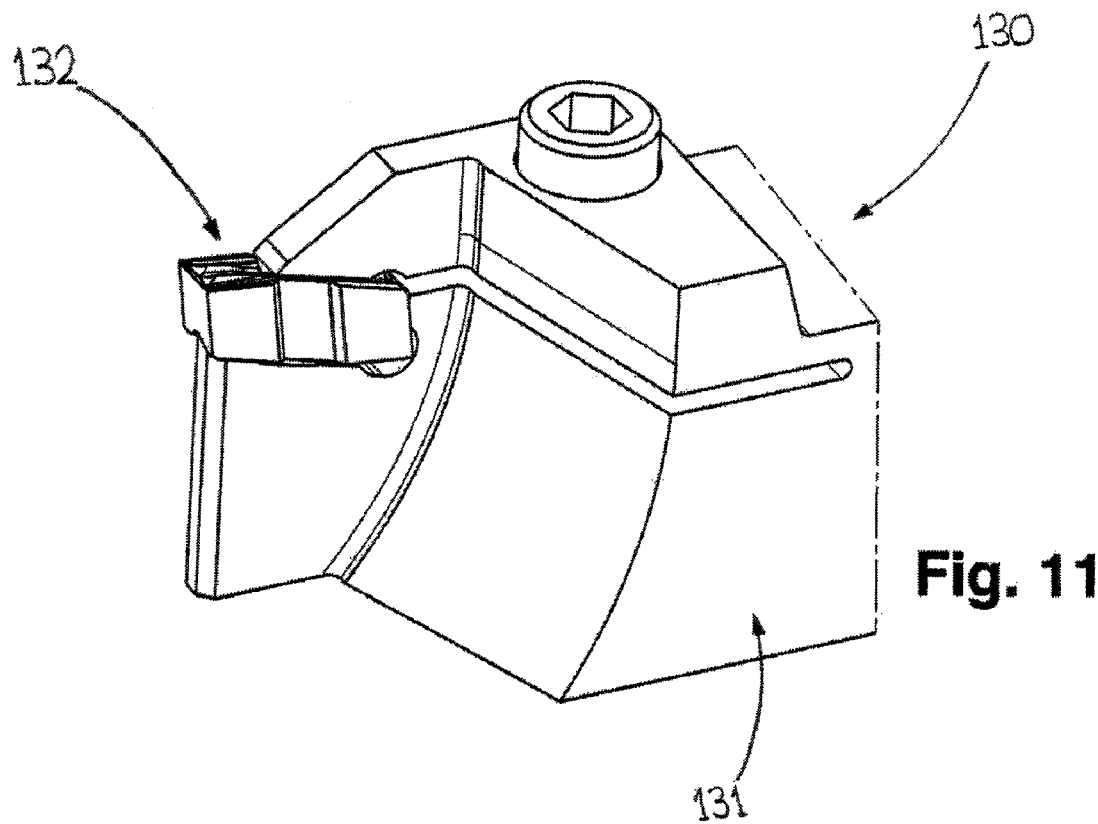
FIG. 11 is of a perspective view of a cutting tool in accordance with a second embodiment of the present invention.
Figure 12:
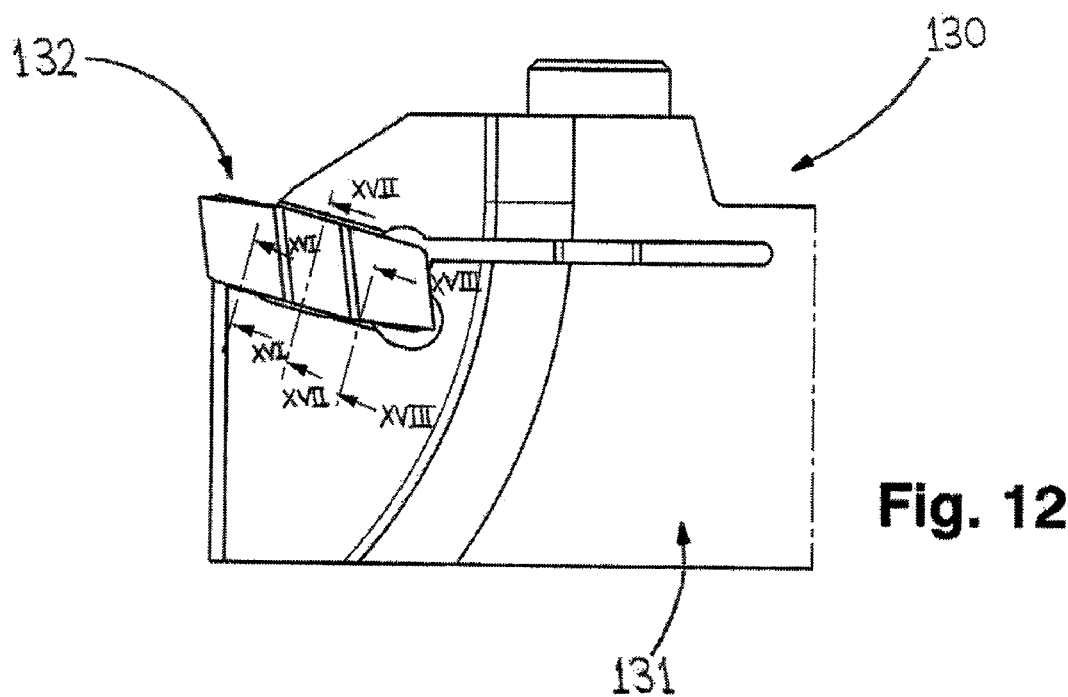
FIG. 12 is a side view of the cutting tool shown in FIG. 11.

The second embodiment of the cutting tool 130, as shown in FIGS. 11 and 12, comprises a cutting insert 132 and insert holder 131.

Figure 13:
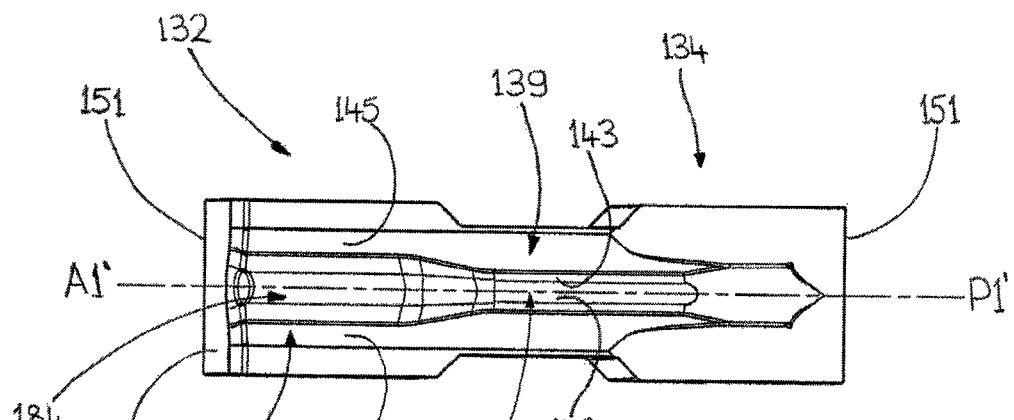
FIG. 13 is a bottom view of the cutting insert shown in FIG. 11.
Figure 14:
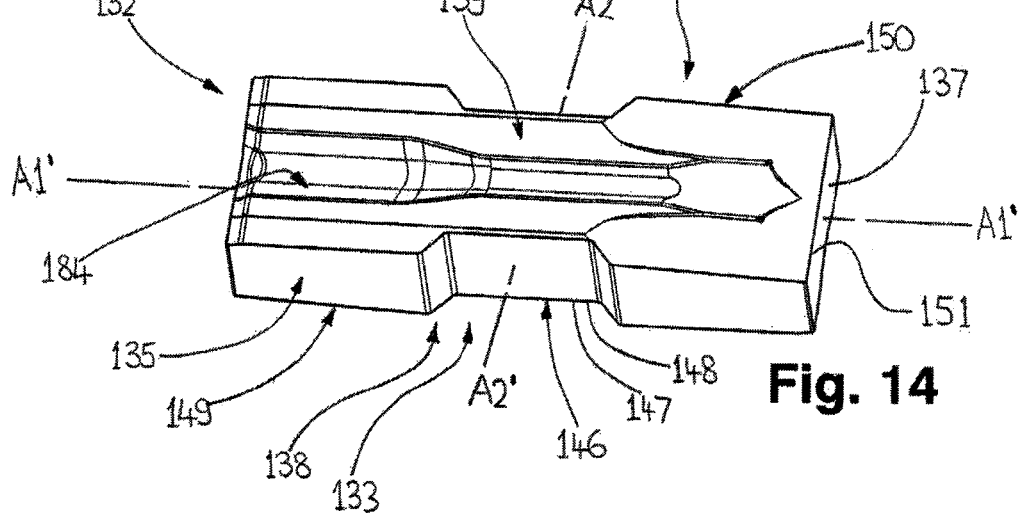
FIG. 14 is a perspective bottom view of the cutting insert shown in FIG. 11.

The cutting insert 132, as shown in FIGS. 13 and 14, comprises upper and lower surfaces 133, 134, and a peripheral side surface 135 extending between the upper and lower surfaces 133, 134. The peripheral side surface 135 comprises front and rear end surfaces 136, 137 with a longitudinal axis A1' passing therebetween. Upper and lower clamping portions 138, 139 are formed on the upper and lower surfaces 133, 134 respectively.

Figure 16:
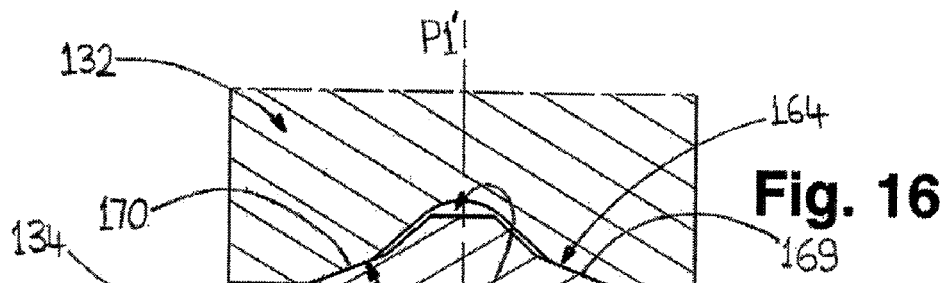
FIG. 16 is a cross-sectional view of the cutting tool shown in FIG. 12 taken along the line XVI-XVI.
Figure 18:
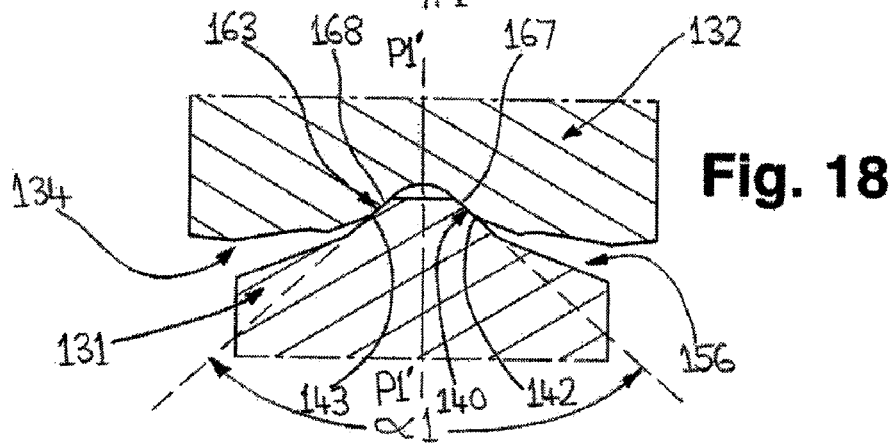
FIG. 18 is a cross-sectional view of the cutting tool shown in FIG. 12 taken along the line XVIII-XVIII.

The lower clamping portion 139 is comprised of two groove type V-shaped insert clamping surfaces 140, 141. The first groove type V-shaped insert clamping surface 140, as shown in FIG. 18, has two surface components 142, 143 forming an external wedge angle α1, and the second groove type V-shaped insert clamping surface 141, as shown in FIG. 16, has two surface components 144, 145 forming an obtuse external wedge angle α2, where α1 is less than α2. A groove type guiding surface 184 adjacent the front end surface 136, is not a feature of the lower clamping portion 139 of the cutting insert 132, and does not provide a means of clamping contact with a lower clamping portion 162 of the insert holder 131.

Figure 17:
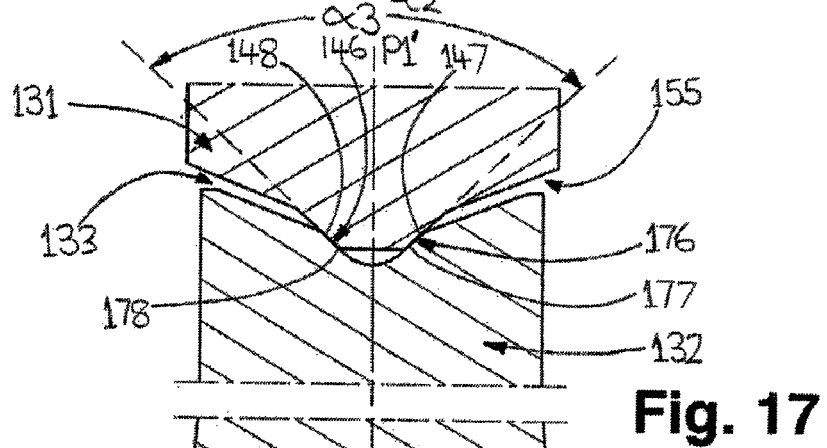
FIG. 17 is a cross-sectional view of the cutting tool shown in FIG. 12 taken along the line XVII-XVII.

The upper clamping portion 138 is comprised of a single groove type V-shaped insert clamping surface 146, as shown in FIG. 17, with two surface components 147, 148 forming an external wedge angle α3, where α3 is less than α2.

Also according to the second embodiment, the cutting insert 132 may have mirror symmetry about a major plane P1', passing through the upper and lower surfaces 133, 134 and the longitudinal axis A1', and in addition rotational symmetry about a minor axis A2', which is perpendicular to the longitudinal axis A1' and passes through the peripheral side surface 135. Upper and lower peripheral edges 149, 150 are formed at the intersection of the upper and lower surfaces 133, 134 with the peripheral side surface 135, where a cutting edge 151 is formed on a portion of each of the upper and lower peripheral edges 149, 150.

Figure 15:
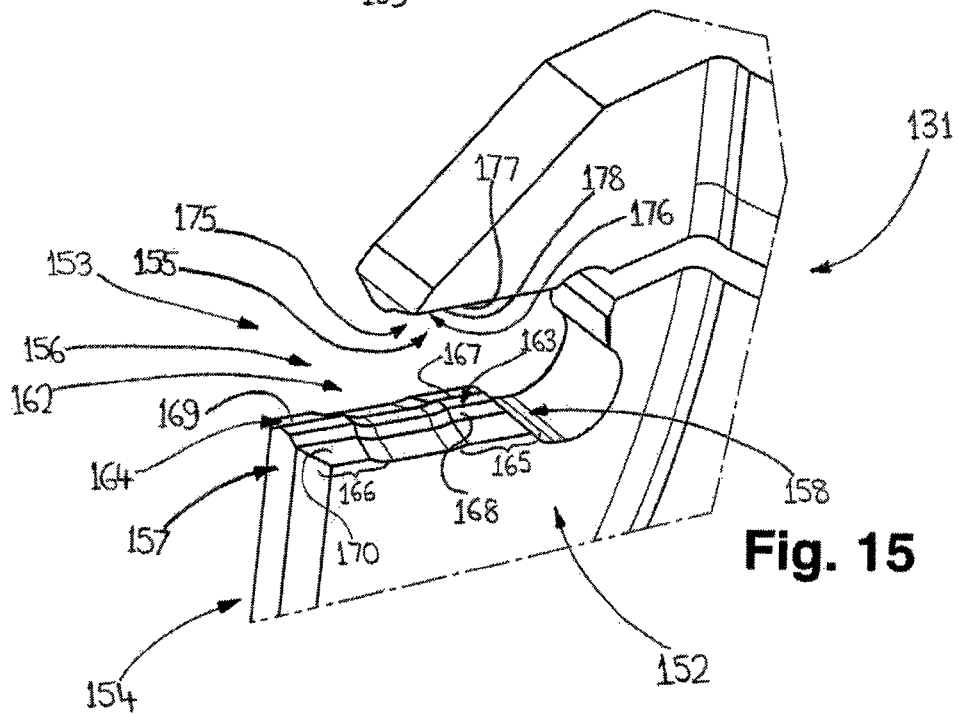
FIG. 15 is a perspective top view of the insert holder shown in FIG. 11.

As shown in FIG. 15, the insert holder 131 of the second embodiment, comprises a holder head 152 having an insert receiving slot 153 opening out to a forward end 154 of the insert holder 131, with upper and lower receiving slot surfaces 155, 156 sharing a common longitudinal direction from a front end 157 to a rear end 158 of the lower receiving slot surface 156.

A lower clamping portion 162 is formed at a first and second contact section 165, 166 adjacent the rear and front ends 158, 157 of the lower receiving slot surface 156, respectively. Each of the first and second contact sections 165, 166 is comprised of two ridge type V-shaped slot clamping surfaces 163, 164. The first V-shaped slot clamping surface 163, as shown in FIG. 18, has two surface components 167, 168 forming an internal wedge angle α1, and the second V-shaped slot clamping surface 164, as shown in FIG. 16, has two surface components 169, 170 forming an obtuse internal wedge angle α2, where α1 is less than α2.

An upper clamping portion 175 formed on the upper receiving slot surface 155 is comprised of a single ridge type V-shaped slot clamping surface 176, as shown in FIG. 17, with two surface components 177, 178 forming an internal wedge angle α3, where α3 is equal to α1.

With the cutting insert 132 firmly secured in the insert holder 131, clamping contact occurs between the cutting insert 132 and insert holder 131 as described below.

The second groove type V-shaped insert clamping surface 141 of the cutting insert 132 lower surface 134, is in clamping contact with the second ridge type V-shaped slot clamping surface 164 at the second contact section 166 of the insert holder 131 lower receiving slot surface 156, where as shown in FIG. 16, the surface components 144, 145 of the second groove type V-shaped insert clamping surface 141 of the cutting insert 132 lower surface 134 are in respective abutment with the surface components 169, 170 of the second ridge type V-shaped slot clamping surface 164 of the insert holder 131 lower receiving slot surface 156, and the surface components 144, 145 and 169, 170 share a common obtuse wedge angle α2.

The first groove type V-shaped insert clamping surface 140 of the cutting insert 132 lower surface 134, is in clamping contact with the first ridge type V-shaped slot clamping surface 163 at the first contact section 165 of the insert holder 131 lower receiving slot surface 156, where as shown in FIG. 18, the surface components 142, 143 of the first groove type V-shaped insert clamping surface 140 of the cutting insert 132 lower surface 134 are in respective abutment with the surface components 167, 168 of the first ridge type V-shaped slot clamping surface 163 of the insert holder 131 lower receiving slot surface 156, and the surface components 142, 143 and 167, 168 share a common wedge angle α1, where α1 is less than α2.

Clamping contact between the V-shaped clamping surface components 144, 145 and 169, 170 at the second contact section 166 of the insert holder 131 lower receiving slot surface 156 occurs at a greater distance from major plane P1' of the cutting insert 132 than clamping contact between the V-shaped clamping surface components 142, 143 and 167, 168 at the first contact section 165 of the insert holder 131 lower receiving slot surface 156.

No clamping contact is made between the cutting insert 132 and insert holder 131, as shown in FIG. 17, along the longitudinal direction of the insert holder 131 lower receiving slot surface 156 between the first and second contact section 165, 166.

The groove type V-shaped insert clamping surface 146 of the cutting insert 132 upper surface 133 is in clamping contact with the ridge type V-shaped slot clamping surface 176 of the insert holder 131 upper receiving slot surface 155, where as shown in FIG. 17, the surface components 147, 148 of the groove type V-shaped insert clamping surface 146 of the cutting insert 132 upper surface 133 are in respective abutment with the surface components 177, 178 of the ridge type V-shaped slot clamping surface 176 of the insert holder 131 upper receiving slot surface 155, and the surface components 147, 148 and 177, 178 share a common wedge angle α3, where α3 is less than α2.

Figure 19:
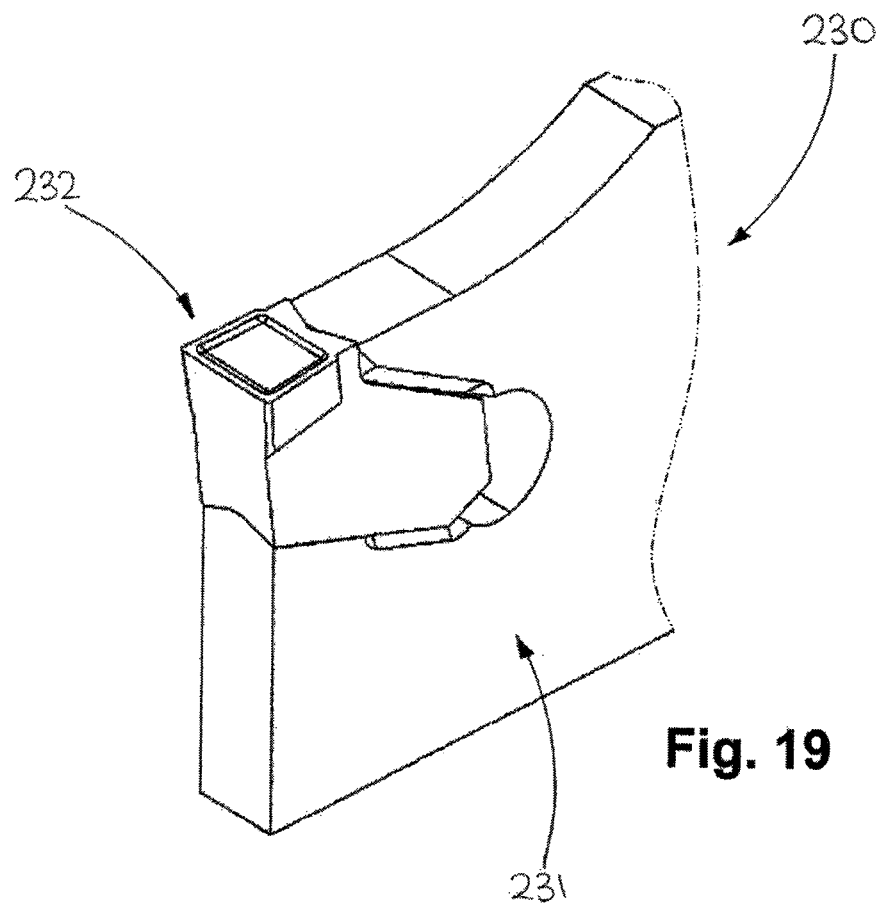
FIG. 19 is of a perspective view of a cutting tool in accordance with a third embodiment of the present invention.
Figure 20:
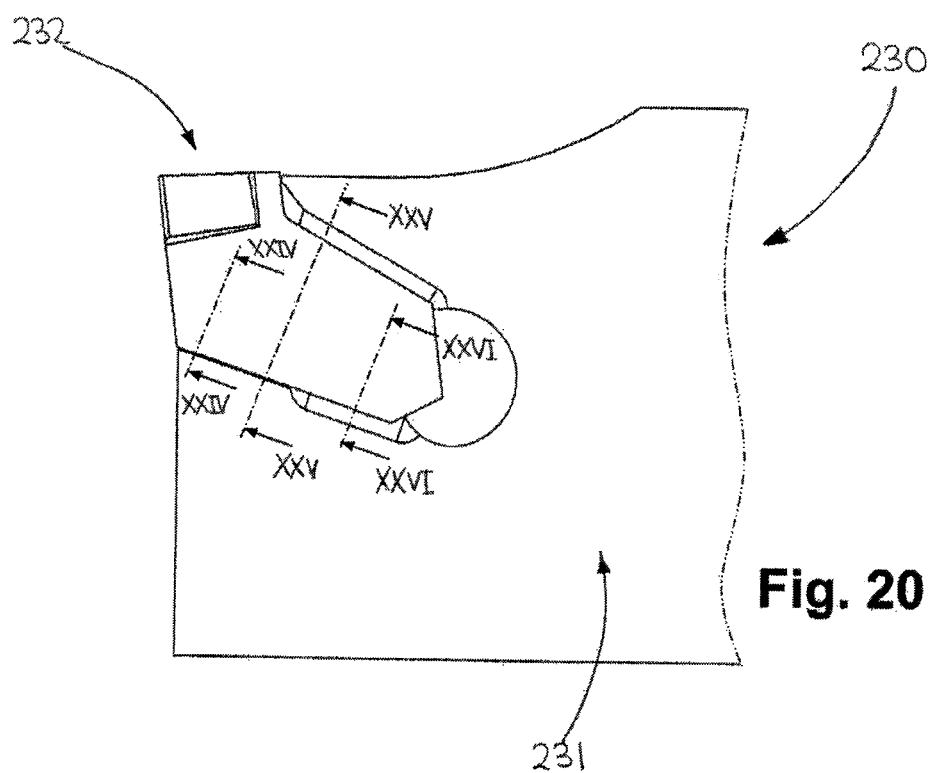
FIG. 20 is side view of the cutting tool shown in FIG. 19.

The third embodiment of the cutting tool 230, as shown in FIGS. 19 and 20, comprises a cutting insert 232 and insert holder 231.

Figure 21:
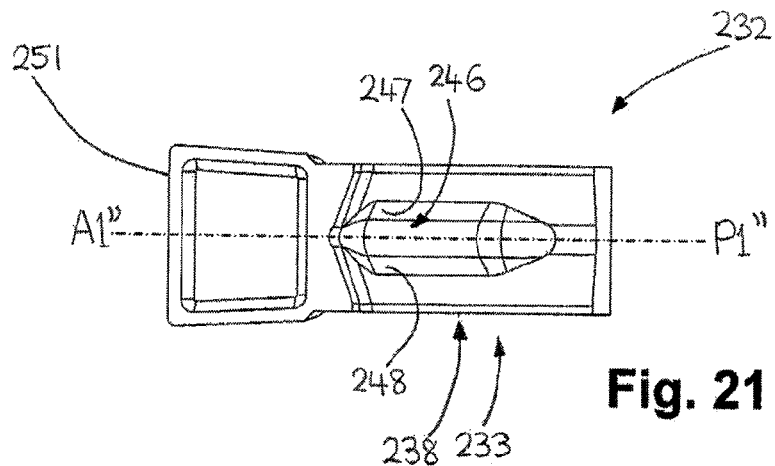
FIG. 21 is a top view of the cutting insert shown in FIG. 19.
Figure 22:
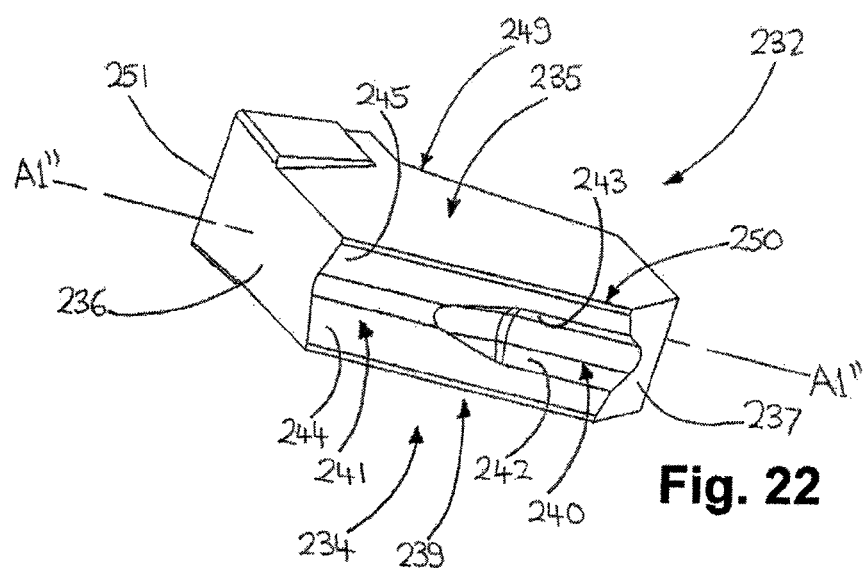
FIG. 22 is a perspective bottom view of the cutting insert shown in FIG. 19.

The cutting insert 232, as shown in FIGS. 21 and 22, comprises upper and lower surfaces 233, 234, and a peripheral side surface 235 extending between the upper and lower surfaces 233, 234. The peripheral side surface 235 comprises front and rear end surfaces 236, 237 with a longitudinal axis A1" passing therebetween. Upper and lower clamping portions 238, 239 are formed on the upper and lower surfaces 233, 234, respectively.

Figure 24:
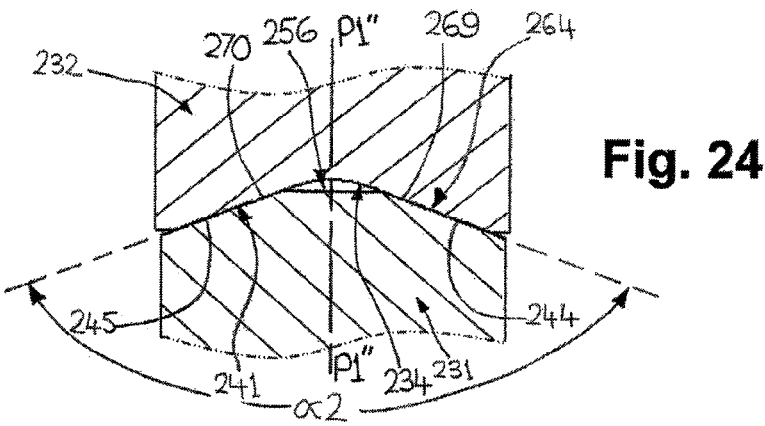
FIG. 24 is a cross-sectional view of the cutting tool shown in FIG. 20 taken along the line XXIV-XXIV.
Figure 25:
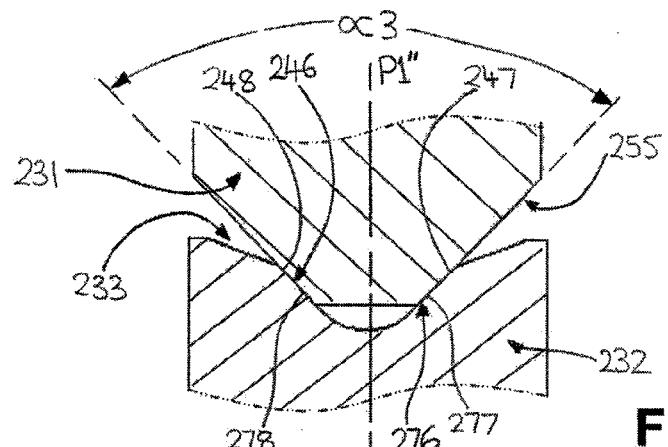
FIG. 25 is a cross-sectional view of the cutting tool shown in FIG. 20 taken along the line XXV-XXV.
Figure 26:
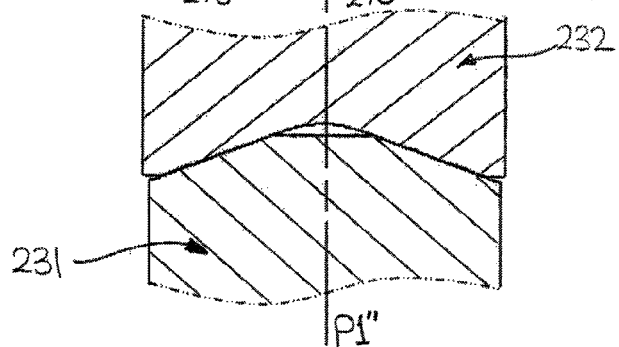
FIG. 26 is a cross-sectional view of the cutting tool shown in FIG. 20 taken along the line XXVI-XXVI.

The lower clamping portion 239 is comprised of two groove type V-shaped insert clamping surfaces 240, 241. The first groove type V-shaped insert clamping surface 240, as shown in FIG. 26, has two surface components 242, 243 forming an external wedge angle α1, and the second groove type V-shaped insert clamping surface 241, as shown in FIG. 24, has two surface components 244, 245 forming an external wedge angle α2, where α1 is less than α2. An upper clamping portion 238 formed on the upper surface 233, is comprised of a single groove type V-shaped insert clamping surface 246, as shown in FIG. 25, with two surface components 247, 248 forming an external wedge angle α3, where α3 is less than α2.

Also according to the third embodiment, the cutting insert 232 may have mirror symmetry about a major plane P1", passing through the upper and lower surfaces 233, 234 and the longitudinal axis A1". Upper and lower peripheral edges 249, 250 are formed at the intersection of the upper and lower surfaces 233, 234, respectively, with the peripheral side surface 235, and a cutting edge 251 is formed along a portion of the upper peripheral edge 249.

Figure 23:
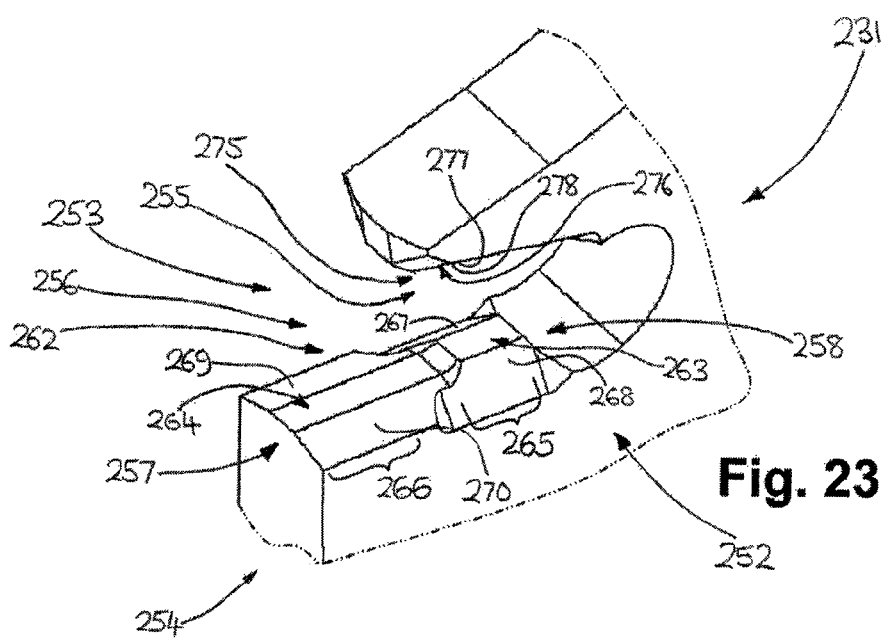
FIG. 23 is a perspective top view of the insert holder shown in FIG. 19.

As shown in FIG. 23, the insert holder 231 of the third embodiment comprises a holder head 252 having an insert receiving slot 253 opening out to a forward end 254 of the insert holder 231, with upper and lower receiving slot surfaces 255, 256 sharing a common longitudinal direction from a front end 257 to a rear end 258 of the lower receiving slot surface 256.

A lower clamping portion 262 formed on the lower receiving slot surface 256, is comprised of two ridge type V-shaped slot clamping surfaces 263, 264 positioned at separate contact sections 265, 266 along the longitudinal direction of the lower receiving slot surface 256. A first contact section 265 is positioned adjacent the rear end 258, where two surface components 267, 268 of the first ridge type V-shaped slot clamping surface 263, as shown in FIG. 26, form an internal wedge angle α1, and a second contact section 266 is positioned adjacent the front end 257, where two surface components 269, 270 of the second ridge type V-shaped slot clamping surface 264, as shown in FIG. 24, form an obtuse internal wedge angle α2, where α1 is less than α2.

An upper clamping portion 275 formed on the upper receiving slot surface 255 is comprised of a single ridge type V-shaped slot clamping surface 276, with two surface components 277, 278, as shown in FIG. 25, forming an internal wedge angle α3, where α3 is less than α2.

With the cutting insert 232 firmly secured in the insert holder 231, clamping contact occurs between the cutting insert 232 and insert holder 231 as described below.

The second groove type V-shaped insert clamping surface 241 of the cutting insert 232 lower surface 234 is in clamping contact with the second ridge type V-shaped slot clamping surface 264 at the second contact section 266 of the insert holder 231 lower receiving slot surface 256, where as shown in FIG. 24, the surface components 244, 245 of the second groove type V-shaped insert clamping surface 241 of the cutting insert 232 lower surface 234 are in respective abutment with the surface components 269, 270 of the second ridge type V-shaped slot clamping surface 264 of the insert holder 231 lower receiving slot surface 256, and the surface components 244, 245 and 269, 270 share a common obtuse wedge angle α2.

The first groove type V-shaped insert clamping surface 240 of the cutting insert 232 lower surface 234 is in clamping contact with the first ridge type V-shaped slot clamping surface 263 at the first contact section 265 of the insert holder 231 lower receiving slot surface 256, where as shown in FIG. 26, the surface components 242, 243 of the first groove type V-shaped insert clamping surface 240 of the cutting insert 232 lower surface 234 are in respective abutment with the surface components 267, 268 of the first ridge type V-shaped slot clamping surface 263 of the insert holder 231 lower receiving slot surface 256, and the surface components 242, 243 and 267, 268 share a common wedge angle α1, where α1 is less than α2.

The groove type V-shaped insert clamping surface 246 of the cutting insert 232 upper surface 233 is in clamping contact with the ridge type V-shaped slot clamping surface 276 of the insert holder 231 upper receiving slot surface 255, where as shown in FIG. 25, the surface components 247, 248 of the groove type V-shaped insert clamping surface 246 of the cutting insert 232 upper surface 233 are in respective abutment with the surface components 277, 278 of the ridge type V-shaped slot clamping surface 276 of the insert holder 231 upper receiving slot surface 255, and the surface components 247, 248 and 277, 278 share a common wedge angle α3, where α3 is less than α2.

In accordance with some embodiments, the three wedge angles α1, α2, and α3 formed between the surface components 42, 43, 142, 143, 242, 243; 44, 45, 144, 145, 244, 245; 47, 48, 147, 148, 247, 248 of the V-shaped clamping surfaces 40, 140, 240; 41, 141, 241; 46, 146, 246 of the cutting inserts 32, 132, 232 have values higher or lower than the matching wedge angle on the insert holder 31, 131, 231 by approximately 1°, in order to control the location of resultant clamping contact regions between the cutting insert 32, 132, 232 and the insert holder 31, 131, 231 following assembly, and therefore reduce the risk of excessive stress concentrations during operation, and use of the expression "common wedge angle" means wedge angles common to within the approximate 1°.

Although the present invention has been described to a certain degree of particularity, it should be understood that various alterations and modifications could be made without departing from the spirit or scope of the invention as hereinafter claimed.

What is claimed is:

1. A cutting tool comprising an insert holder and a cutting insert removably securable in the insert holder, wherein:
the cutting insert comprises:
upper and lower surfaces;
a peripheral side surface extending between the upper and lower surfaces, the peripheral side surface comprising front and rear end surfaces with a longitudinal axis passing therebetween;
peripheral edges formed at the intersection of the upper and lower surfaces with the peripheral side surface, wherein at least one portion of at least one of the peripheral edges comprises a cutting edge; wherein:
the lower surface has first and second insert clamping surfaces, each insert clamping surface having a generally V-shaped cross-section;
surface components of the first insert clamping surface form a first wedge angle ($\alpha$1);
surface components of the second insert clamping surface form an obtuse second wedge angle ($\alpha$2); and
the first wedge angle ($\alpha$1) is smaller than the second wedge angle ($\alpha$2);
the insert holder comprises:
a holder head with an insert receiving slot opening out to a forward end of the insert holder, wherein the insert receiving slot includes upper and lower receiving slot surfaces sharing a common longitudinal direction;
upper and lower clamping portions formed on the upper and lower receiving slot surfaces respectively, wherein the lower clamping portion has generally V-shaped first and second slot clamping surfaces positioned at respective first and second contact sections along the lower receiving slot surface; wherein:
the first contact section is located adjacent a rear end of the lower receiving slot surface;
the second contact section is located adjacent a front end of the lower receiving slot surface;
surface components of the generally V-shaped slot clamping surface at the first contact section form a first wedge angle ($\alpha$1);
surface components of the generally V-shaped slot clamping surface at the second contact section form an obtuse second wedge angle ($\alpha$2); and
the first wedge angle ($\alpha$1) is smaller than the second wedge angle ($\alpha$2);
clamping contact between the first insert clamping surface and the first slot clamping surface occurs only at the first contact section;
clamping contact between the second insert clamping surface and the second slot clamping surface occurs only at the second contact section; and
the holder head is formed of a first material and the cutting insert is formed of a second material which is harder than the first material.

2. The cutting tool according to claim 1, wherein:
the upper surface of the cutting insert comprises a third insert clamping surface having a generally V-shaped cross-section, surface components of the third insert clamping surface forming a third wedge angle ($\alpha$3);
the upper receiving slot surface of the insert holder comprises a generally V-shaped third slot clamping surface, surface components of the third slot clamping surface also forming a third wedge angle ($\alpha$3); and
third slot clamping surface is in clamping contact with the third insert clamping surface.

3. The cutting tool according to claim 2, wherein the third wedge angle ($\alpha$3) is less than the second wedge angle ($\alpha$2).

4. The cutting tool according to claim 2, wherein the third wedge angle ($\alpha$3) is equal to the first wedge angle ($\alpha$1).

5. The cutting tool according to claim 1, wherein the cutting insert has mirror symmetry about a major plane passing through the upper and lower surfaces and the longitudinal axis.

6. The cutting tool according to claim 5, wherein clamping contact between the surface components of the second clamping surfaces occurs at a greater distance from the major plane of the cutting insert than clamping contact between the surface components of the first clamping surfaces.

7. The cutting tool according to claim 1, wherein the first and second insert clamping surfaces have different longitudinal lengths.

8. An insert holder comprising:
a holder head with an insert receiving slot opening out to a forward end of the insert holder, wherein the insert receiving slot includes upper and lower receiving slot surfaces sharing a common longitudinal direction; and
upper and lower clamping portions formed on the upper and lower receiving slot surfaces respectively, wherein the lower clamping portion has generally V-shaped first and second slot clamping surfaces positioned at respective first and second contact sections along the lower receiving slot surface;
wherein:
the first contact section is located adjacent a rear end of the lower receiving slot surface;
the second contact section is located adjacent a front end of the lower receiving slot surface;
surface components of the first slot clamping surface form a first wedge angle ($\alpha$1);
surface components of the second slot clamping surface form an obtuse second wedge angle ($\alpha$2); and
the first wedge angle ($\alpha$1) is smaller than the second wedge angle ($\alpha$2).

9. The insert holder according to claim 8, wherein the first wedge angle ($\alpha$1) is acute.

10. The insert holder according to claim 8, wherein the upper clamping portion has a generally V-shaped slot clamping surface, with surface components forming a third wedge angle ($\alpha$3).

11. The insert holder according to claim 10, wherein the third wedge angle ($\alpha$3) is less than the second wedge angle ($\alpha$2).

12. The insert holder according to claim 10, wherein the third wedge angle ($\alpha$3) is equal to the first wedge angle ($\alpha$1).

13. A cutting insert comprising:
upper and lower surfaces;
a peripheral side surface extending between the upper and lower surfaces, the peripheral side surface comprising front and rear end surfaces with a longitudinal axis passing therebetween;
peripheral edges formed at the intersection of the upper and lower surfaces with the peripheral side surface, wherein at least one portion of at least one of the peripheral edges comprises a cutting edge; and
upper and lower clamping portions formed on the upper and lower surfaces respectively; wherein:
at least a first of the upper and lower clamping portions has first and second insert clamping surfaces, each insert clamping surface having a generally V-shaped cross-section, and both insert clamping surfaces arranged to simultaneously clampingly abut an upper or lower clamping surface of an insert holder;
surface components of the first insert clamping surface form a first wedge angle ($\alpha$1);

surface components of the second insert clamping surface form a second wedge angle (α2);
wedge angles (α1) and (α2) are different from one another; and
the first and second insert clamping surfaces have different longitudinal lengths.

14. A cutting insert comprising:
upper and lower surfaces;
a peripheral side surface extending between the upper and lower surfaces, the peripheral side surface comprising front and rear end surfaces with a longitudinal axis passing therebetween;
peripheral edges formed at the intersection of the upper and lower surfaces with the peripheral side surface, wherein at least one portion of at least one of the peripheral edges comprises a cutting edge; and
upper and lower clamping portions formed on the upper and lower surfaces respectively; wherein:
at least a first of the upper and lower clamping portions has first and second insert clamping surfaces, each insert clamping surface having a generally V-shaped cross-section;
surface components of the first insert clamping surface form a first wedge angle (α1);
surface components of the second insert clamping surface form a second wedge angle (α2);
wedge angles (α1) and (α2) are different from one another;
the first and second insert clamping surfaces have different longitudinal lengths; and
the second insert clamping surface fully extends from the front end surface to the rear end surface.

15. The cutting insert according to claim 14, wherein the second insert clamping surface is a groove type V-shaped clamping surface.

16. The cutting insert according to claim 14, wherein the second wedge angle (α2) is obtuse.

17. The cutting insert according to claim 14, wherein the first wedge angle (α1) is less than the second wedge angle (α2).

18. The cutting insert according to claim 13, having mirror symmetry about a major plane passing through the upper and lower surfaces and containing the longitudinal axis.

19. A cutting insert comprising:
upper and lower surfaces;
a peripheral side surface extending between the upper and lower surfaces, the peripheral side surface comprising front and rear end surfaces with a longitudinal axis passing therebetween;
peripheral edges formed at the intersection of the upper and lower surfaces with the peripheral side surface, wherein at least one portion of at least one of the peripheral edges comprises a cutting edge; and
upper and lower clamping portions formed on the upper and lower surfaces respectively; wherein:
at least a first of the upper and lower clamping portions has first and second insert clamping surfaces, each insert clamping surface having a generally V-shaped cross-section;
surface components of the first insert clamping surface form a first wedge angle (α1);
surface components of the second insert clamping surface form a second wedge angle (α2);
wedge angles (α1) and (α2) are different from one another;
the first and second insert clamping surfaces have different longitudinal lengths; and
the cutting insert has mirror symmetry about a minor plane perpendicular to the longitudinal axis.

20. The cutting insert according to claim 13, wherein two portions of at least one of the peripheral edges comprise a cutting edge.

21. A cutting insert comprising:
upper and lower surfaces;
a peripheral side surface extending between the upper and lower surfaces, the peripheral side surface comprising front and rear end surfaces with a longitudinal axis passing therebetween;
peripheral edges formed at the intersection of the upper and lower surfaces with the peripheral side surface, wherein at least one portion of at least one of the peripheral edges comprises a cutting edge; and
upper and lower clamping portions formed on the upper and lower surfaces respectively; wherein:
at least a first of the upper and lower clamping portions has first and second insert clamping surfaces, each insert clamping surface having a generally V-shaped cross-section;
surface components of the first insert clamping surface form a first wedge angle (α1);
surface components of the second insert clamping surface form a second wedge angle (α2);
wedge angles (α1) and (α2) are different from one another;
the first and second insert clamping surfaces have different longitudinal lengths; and
a second of the upper and lower clamping portions has a third insert clamping surface having surface components which form a third wedge angle (α3) which is less than second wedge angle (α2).

* * * * *